UNITED STATES PATENT OFFICE.

GEORGE G. OBERFELL AND HUGH T. BOYD, OF HOMER, OHIO, ASSIGNORS TO THE OHIO FUEL SUPPLY COMPANY, OF PITTSBURGH, PENNSYLVANIA, A CORPORATION OF OHIO.

MANUFACTURE OF AMYL ACETATE AND ITS HOMOLOGUES FROM CHLOR-HYDROCARBONS OF THE PARAFFIN SERIES.

1,302,583.      Specification of Letters Patent.      Patented May 6, 1919.

No Drawing.      Application filed January 22, 1918. Serial No. 213,250.

*To all whom it may concern:*

Be it known that we, GEORGE G. OBERFELL and HUGH T. BOYD, citizens of the United States, and residents of Homer, Ohio, have invented certain new and useful Improvements in the Manufacture of Amyl Acetate and Its Homologues from Chlor-Hydrocarbons of the Paraffin Series, of which the following is a specification.

This invention relates to improvements in the manufacture of amyl acetate or its homologues from chlorids of the paraffin hydrocarbons having more than one carbon atom.

It is known (see *Schorlemmer Liebig's Annalen*, 1872, vol 161, p. 264, lines 27–30) that in the decomposition of chlor-compounds of the paraffin hydrocarbons having more than one carbon atom with alkali acetate in the presence of acetic acid, large volumes of amylenes are produced, whereby the yield in amyl acetate is reduced.

Now I have found that by the use of fused alkali acetate and acetic acid in the presence of sodium or potassium sulfate the formation of amylenes is decreased and a yield of 65% of the theoretical by weight of pure amyl acetate of a boiling point 120°–148° C. is produced.

More than a very small water content in the alkali acetate is prejudicial and leads to the increased formation of amylenes.

The following charge is used:

100 parts by weight of chlorpentane
72 " " " " alkali acetate
$\frac{6}{12}$ " " " " acetic acid
1 " " " " sodium or potassium sulfate.

The charge is heated from 8–14 hours under pressure and a temperature of 195° C. in a mechanically stirred acid resisting autoclave.

The esterified product may be removed by distillation under pressure from the retort.

What we claim is:

1. A method of esterifying chlor-hydrocarbons of the paraffin series which consists in treating the chlor-hydrocarbons with an alkali acetate and acetic acid in the presence of a sulfate of an alkali metal.

2. A method of esterifying chlor-hydrocarbons of the paraffin series which consists in heating under pressure the chlor-hydrocarbons with an alkali acetate and acetic acid in the presence of a sulfate of an alkali metal.

3. A method of esterifying chlor-hydrocarbons of the paraffin series which consists in heating and stirring under pressure the chlor-hydrocarbons with an alkali acetate and acetic acid in the presence of a sulfate of an alkali metal.

In testimony whereof, we affix our signatures.

GEORGE G. OBERFELL.
HUGH T. BOYD.